United States Patent
Barnhill

(12) 
(10) Patent No.: US 6,253,459 B1
(45) Date of Patent: Jul. 3, 2001

(54) COMBINED RING SIZER AND GEMSTONE MEASURING DEVICE

(76) Inventor: Thomas K. Barnhill, 8328 E. University, Mesa, AZ (US) 85207

( * ) Notice: Subject to any disclaimer, the term of this patent is extended or adjusted under 35 U.S.C. 154(b) by 0 days.

(21) Appl. No.: 09/310,046

(22) Filed: May 11, 1999

(51) Int. Cl.[7] ............................... G01B 3/10; G01B 3/34
(52) U.S. Cl. ..................... 33/514.1; 33/555.4; 33/549
(58) Field of Search .................. 33/514.1, 511, 33/512, 549, 555.1, 555.4, 488

(56) References Cited

U.S. PATENT DOCUMENTS

| | | | |
|---|---|---|---|
| D. 384,588 | 10/1997 | Napier . | |
| 1,213,607 | * 1/1917 | Engelsman | 33/514.1 |
| 1,216,672 | * 2/1917 | Eisen | 33/514.1 |
| 1,413,319 | * 4/1922 | Buchsbaum | 33/514.1 |
| 1,616,060 | * 2/1927 | Myers | 33/679.1 |
| 1,634,378 | * 7/1927 | Mountford | 33/514.1 |
| 1,861,527 | * 6/1932 | Grimm | 33/514.1 |
| 2,736,097 | * 2/1956 | Coleman, Jr. | 33/488 |
| 3,744,140 | * 7/1973 | Kyrk | 33/514.1 |
| 4,471,634 | 9/1984 | Kaplan . | |
| 4,569,139 | * 2/1986 | Wakeling | 33/555.4 |
| 5,123,906 | 6/1992 | Kelman . | |
| 5,171,314 | 12/1992 | Dulebohn . | |
| 5,201,741 | 4/1993 | Dulebohn . | |
| 5,269,069 | * 12/1993 | Min | 33/514.1 |
| 5,390,570 | 2/1995 | Reisner . | |
| 5,417,684 | 5/1995 | Jackson et al. . | |
| 5,522,819 | 6/1996 | Graves et al. . | |
| 5,752,731 | 5/1998 | Crone . | |

FOREIGN PATENT DOCUMENTS

0610684 * 6/1978 (SU) ........................................ 33/488

OTHER PUBLICATIONS

1999 Hand Therapy Catalog, North Coast Medical Inc. Morgan Hill, CA, pp. 123 (No Month).

* cited by examiner

Primary Examiner—Christopher W. Fulton
(74) Attorney, Agent, or Firm—Schmeiser, Olsen & Watts

(57) ABSTRACT

A combined measuring device for indicating both the ring size of a user and the size of a gemstone, includes an elongate housing having a hollow interior and a first measurement scale located along a length of the housing. The first measurement scale includes indicia representative of different ring sizes. An indicator is slidably mounted on the housing for movement along the measurement scale, with at least a portion of the indicator extending into the hollow interior of the housing. A flexible measuring band has a first end removably connected to an end portion of the housing and a second end connected to the indicator portion within the housing. The flexible measuring band forms a measuring loop outside of the housing such that movement of the indicator along the housing changes the size of the measuring loop to thereby adjust to the size of an object to be measured. A second measurement scale is located on a length of the flexible measuring band and includes indicia representative of distance. With this arrangement, the relative position of the indicator with respect to the first measurement scale is indicative of ring size when at least a portion of the object is located within the measuring loop, and the relative position of the second measurement scale with respect to the housing is indicative of gemstone size. The measuring band may be removed from the housing for independently measuring distance or other geometrical parameters. A groove or step may be formed on an inner surface of the measuring loop for holding an object being measured.

17 Claims, 4 Drawing Sheets

COMBINED RING SIZER AND GEMSTONE MEASURING DEVICE

BACKGROUND OF THE INVENTION

1. Field of the Invention

This invention relates to measuring devices with flexible measuring bands, and more particularly to a measuring device having a flexible band for determining the ring size of a person and the size and quality of a gemstone.

2. Description of the Related Art

During a visit to a jewelry establishment, it is common to determine a person's ring size for purchasing a ring or for adjusting a previously purchased ring. It is also common to choose a gemstone for mounting on a ring and for verifying or determining the quality of the gemstone. Unfortunately, the measurement of ring sizes and gemstones, as well as the holding and examination of gemstones, has heretofore been accomplished with different tools. When determining ring size, a flexible measuring tape is typically wrapped around the perimeter of a finger at a location where a ring is to be worn. The measuring tape may include distance measuring indicia, such as inches or centimeters, which thereafter requires referral to a chart or table to determine the appropriate ring size. Ring size indicia may alternatively be conveniently imprinted directly onto a surface of a flexible tape for directly determining ring size.

In addition, the holding of gemstones during examination or measurement can be awkward. The gemstone must either be mounted or held carefully with a holding device in one hand while a measuring device or jewler's lens is appropriately positioned with the other hand. Any minor misalignment between the holding device and intricate surfaces of the gemstone may result in dropping the gemstone, leading to fracture or other consequences.

SUMMARY OF THE INVENTION

It is an object of the invention to provide a measuring device for determining both the ring size of a person and for measuring a geometrical parameter of an object, such as a gemstone.

It is a further object of the invention to provide a device for simultaneously holding, measuring and examining an object, such as a gemstone.

It is an even further object of the invention to provide a measuring device that is relatively easy to use and inexpensive to manufacture.

According to one embodiment of the invention, a device for measuring at least one geometrical parameter of an object comprises an elongate housing having a hollow interior with a first measurement scale located on a length of the housing and an indicator slidably mounted on the housing for movement along the measurement scale. At least a portion of the indicator extends into the hollow interior of the housing. A flexible measuring band has a first end connected to an end portion of the housing and a second end connected to the indicator portion located within the housing. The flexible measuring band is oriented so as to form a measuring loop outside of the housing. Movement of the indicator along the housing causes expansion and contraction of the measuring loop to thereby adjust for the size of an object to be measured. With this arrangement, the relative position of the indicator with respect to the first measurement scale is indicative of the at least one geometrical parameter when at least a portion of the object is located within the measuring loop. A second measurement scale may be located on a length of the flexible measuring band. Preferably, the first measurement scale denotes a first geometrical parameter and the second measurement scale denotes a second geometrical parameter that is different from the first geometrical parameter.

In one preferred embodiment, the measuring band may be removably connected to the housing for measuring distance independent of the housing.

In yet a further embodiment, the measuring loop has an inner surface with a groove formed therein for holding an object during examination and/or measurement. Alternatively, the inner surface may include a stepped portion for holding the object during examination and/or measurement.

In still another embodiment, a magnifying lens may be connected to the housing for positioning in proximity to the measuring loop in order to permit examination of an object held within the measuring loop. The magnifying lens is preferably pivotal and slidable with respect to the housing.

According to an even further embodiment of the invention, a measuring device for indicating the ring size of a user and the size of a gemstone, comprises an elongate housing having a hollow interior and a first measurement scale located on a length of the housing. The first measurement scale includes indicia representative of different ring sizes. An indicator is slidably mounted on the housing for movement along the measurement scale, with at least a portion of the indicator extending into the hollow interior of the housing. A flexible measuring band has a first end connected to an end portion of the housing and a second end connected to the indicator portion within the housing. The flexible measuring band forms a measuring loop outside of the housing such that movement of the indicator along the housing causes expansion and contraction of the measuring loop to thereby adjust for the size of an object to be measured. A second measurement scale is located on a length of the flexible measuring band. The second measurement scale includes indicia representative of distance. With this arrangement, the relative position of the indicator with respect to the first measurement scale is indicative of ring size when at least a portion of the object is located within the measuring loop, and the relative position of the second measurement scale with respect to the housing is indicative of gemstone size.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
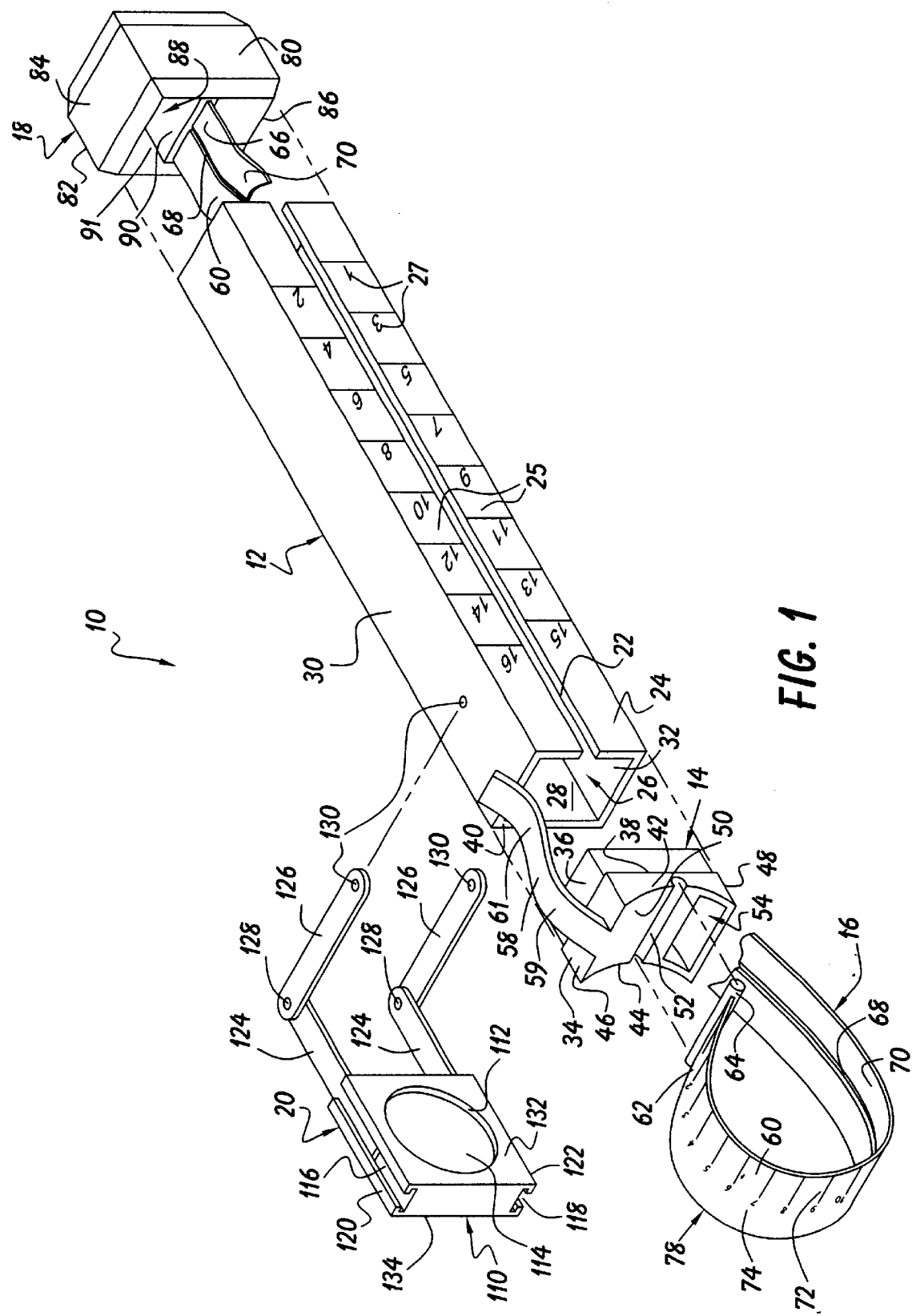
FIG. 1 is a front isometric exploded view of a measuring device according to the invention.
Figure 2:
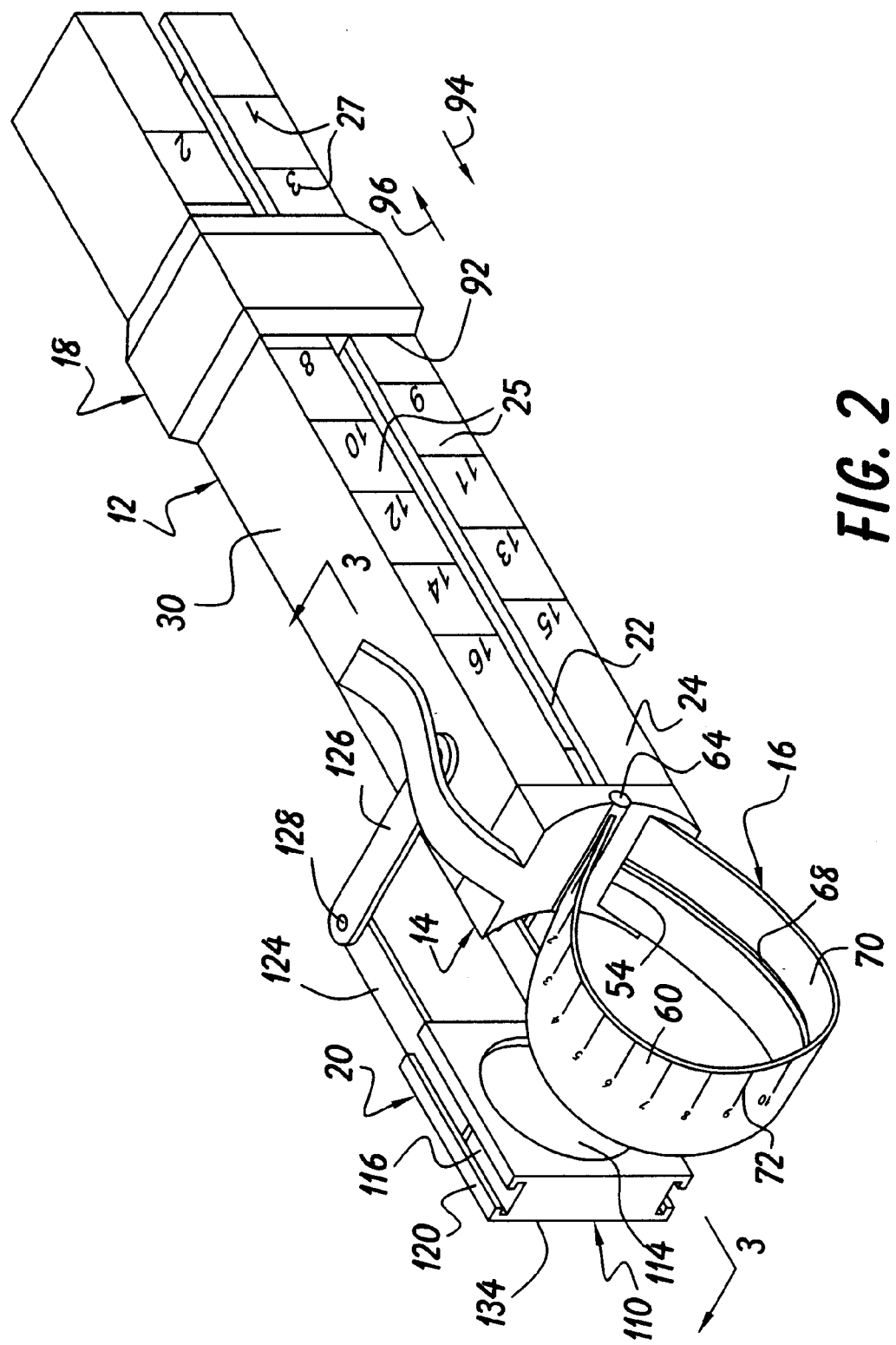
FIG. 2 is a front isometric view of the assembled measuring device of FIG. 1.

Referring now to the drawings, and to FIGS. 1 and 2 in particular, a measuring device 10 according to the invention includes an elongate housing 12, an end cap 14 connected to one end of the housing, a measuring band 16 removable connected to the end cap and extending into the housing, an indicator 18 slidably mounted on the housing, and a magnifying assembly 20 pivotally mounted to the housing. If desired, a second end cap (not shown) may be connected to an end of the housing 12 opposite the end cap 14.

The elongate housing 12 is preferably tubular in shape and comprises a pair of side walls 24 and 28 connected to an upper wall 30 and a lower wall 32. The housing 12 may be square or rectangular in cross section, although other cross-sectional shapes such as circular, triangular, octagonal, and so on, are contemplated. A slot 22 is formed in the side wall 24 of the housing 12 and communicates with the interior 26 of the housing. Preferably, the slot 22 extends along the length of the side wall 24. A measurement scale 25 is positioned on the side wall 24 and extends on opposite sides of the slot 22. Preferably, the measurement scale includes numerals 27 that are indicative of different ring sizes.

Figure 3:
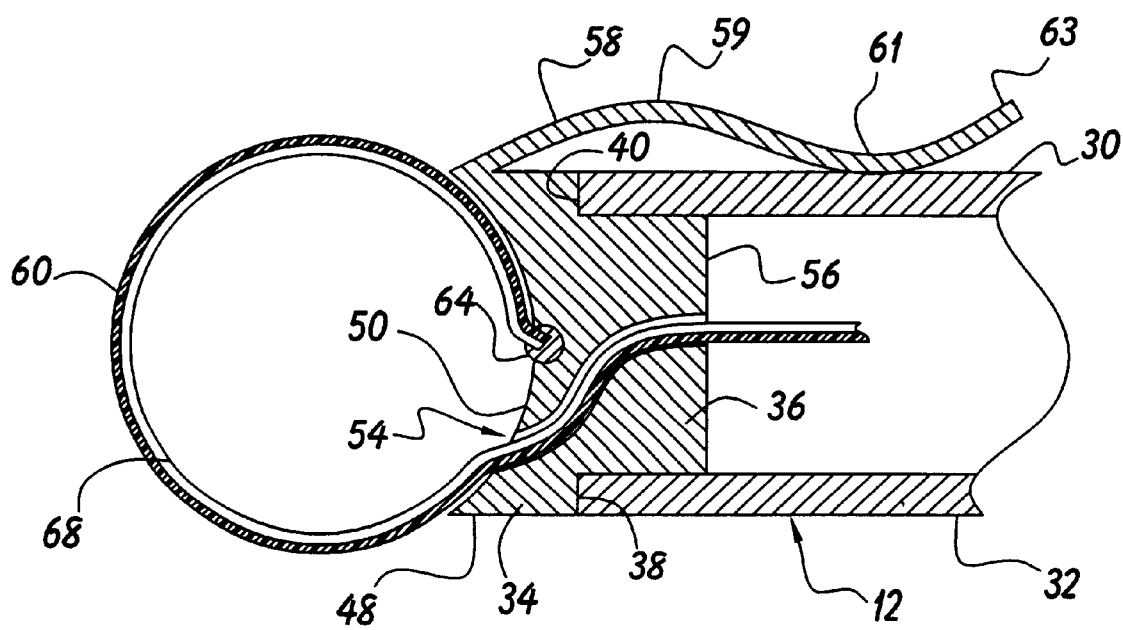
FIG. 3 is a cross sectional view of a portion of the measuring device taken along line 3—3 of FIG. 2.

With additional reference to FIG. 3, the end cap 14 comprises a outer portion 34 and a base portion 36 extending from the outer portion. The base portion 36 is sized and shaped to fit snugly within the interior 26 of the housing. A ledge 38 is formed at the intersection of the top and base portions around the perimeter of the end cap 14. The ledge 38 abuts an outer edge 40 of the tubular housing 12. The outer portion 34 includes a pair of side walls 42 and 44 connected to an upper wall 46 and a lower wall 48. Preferably, the side walls 42, 44 and upper and lower walls 46, 48 are similar in shape and dimension to the walls 24, 28, 30 and 32 of the housing 12 in order to provide a smooth transition between the end cap 14 and the housing. An arcuately-shaped front wall 50 is formed in the outer portion 34 and a semicircular groove 52 is formed in the front wall 50. A slot 54 extends through the end cap 14 from the front wall 50 to a rear wall 56 of the base portion 36. As shown most clearly in FIG. 3, the slot 54 is spaced from the bottom wall 48 and curves upwardly from the bottom wall before reaching the rear wall 56. The function of the curved front wall 50 and groove 52, along with slot 54 will be described in greater detail below in conjunction with the measuring band 16.

A clip 58 is preferably integrally formed on the outer portion 34 of the end cap 14 so that the measuring device 10 can be stored in the pocket of a user when not in use. The clip 58 includes an outwardly curved portion 59 and an inwardly curved portion 61 that normally biases against the upper wall 30 of the housing 12. A flared free end 63 of the clip facilitates movement of the clip when inserted into the pocket.

The measuring band 16 includes an elongate, flexible tape member 60 with a first end 62 connected to a cylindrical locking member 64 and a second end 66 connected to the indicator 18. The tape member 60 may be formed of metal, plastic, cloth, or any combination thereof. Depending on the type of material that forms the tape member 60, the first and second ends may be insert-molded with the locking member 64 and indicator 18, respectively. Alternatively, one or both of the ends 62 and 66 may be connected through fasteners, adhesive, or other well known connecting means, to the locking member 64 and indicator 18, respectively. A groove 68 is formed in a first surface 70 of the tape member 60 and preferably extends along the length thereof from the first end 62 to the second end 66. The shape of the groove 68 is preferably triangular in cross section, but may be formed with different cross sectional shapes. A scale 72 is formed on a second surface 74 of the tape member and also preferably extends along the length thereof from the first end 62 to the second end 66. Preferably, the scale is in centimeters, but may alternatively or in addition include imperial units of measure or any other units indicative of distance, girth, diameter, weight, and so on. While scale 72 is shown on second surface 74 it should be appreciated that scale 72 may also be located on a surface of elongate housing 12, such as upper wall 32 or one of the other surfaces.

As shown most clearly in FIGS. 2 and 3, the tape member 60 extends through the slot 54 in the end cap 14 with the cylindrical locking member 64 received within the groove 52 on the curved front wall 50. Preferably, the locking member 64 snap-fits into the groove 52 so that the measuring band 16 can be removed from the housing 12 and used independently for measurements that would otherwise be inhibited by the housing. When the measuring band 16 is installed on the end cap and housing, a loop 78 is formed for measuring the diameter, circumference, size, or girth of an object located within the loop.

With reference again to FIGS. 1 and 2, the indicator 18 is preferably tubular in shape and comprises a pair of side walls 80 and 82 connected to an upper wall 84 and a lower wall 86. The walls 80 to 84 together form an interior 88 that is sized and shaped to slidably receive the housing 12. Although a square or rectangular cross sectional shape is preferred for the indicator 18, at least the interior 88 of the indicator 18 is shaped to match the exterior shape of the housing 12, whether it be circular, triangular, octagonal, and so on, in cross section. A finger 90 is formed integrally with the side wall 80 and extends into the interior 88 of the indicator 18. A space 91 is formed between the finger 90 and the side wall 82 in order to provide clearance for the side wall 28 of the housing 12 when installed thereon. The second end 66 of the tape member 70 is preferably fixedly secured to the finger 90. Alternatively, the second end 66 may be releasably secured to the finger 90. When the indicator 18 is slidably mounted to the housing 12, the finger 90 is received in the slot 22 of the housing. A forward edge 92 of the indicator 18 is preferably a reference edge for reading the scale 25. If desired, the indicator may include locking means (not shown) for securing the position of the indicator with respect to the housing 12. This is especially advantageous where it is desired to clamp the object to be measured in the band during examination of the object, and/or when it is desired to memorize the position of the band after a measurement has taken place, in order to permit the user to accomplish another task before recording the measurement. Locking means may be as simple as a threaded fastener extending through a wall of the indicator for engaging a wall of the housing 12.

In use, the indicator 18 is mounted on the housing 12 and the locking member 64 is positioned within the groove 52 to thereby form the measuring loop 78. The size of the loop 78 can be adjusted by sliding the indicator 18 along the housing, as indicated by direction arrows 94 and 96, or by pulling the tape member outwardly from the slot 54 in the end cap 14. Once adjusted, an object such as a finger can be positioned in the loop and the loop tightened against the finger by sliding the indicator 18 away from the end cap 14, as denoted by direction arrow 96. Once the loop is snug against the finger, the scale 25 is then read at the reference edge 92 of the indicator 18. Since the scale 25 is indicative of ring size, the user can immediately determine which ring size is most appropriate for the finger being measured.

When it is desirous to measure a gemstone, the loop 78 is adjusted to approximate the size of the gemstone. The gemstone is then inserted into the loop with edges of the gemstone located within the groove 68 of the tape member 60. The arcuate shape of the front wall 50 along with the curved slot 54 in the end cap 14 and pressure from the tape member itself against the gemstone or other object being measured causes the object to be pulled toward the front wall 50 and compress the tape member against the arcuate surface to thereby form a substantially circular loop 78, as shown most clearly in FIG. 3. This is especially important when measuring gemstones, since the groove 68 encompasses a substantial portion of a perimeter of the gemstone. In this manner, the gemstone can be securely held in place during measurement or examination with the magnifying assembly 20. If desired, a matching groove (not shown) can be formed on the front wall 50 between the slot 54 and cylindrical groove 52 to provide an even greater surface area for seating the gemstone. Once the loop 78 is drawn snugly around the gemstone, the scale 72 can be read, preferably at the intersection of the slot 54 and the tape member 60, to thereby ascertain the size of the gemstone.

Although it is preferred that the tape member 60 carries units representative of distance and the housing carries units representative of ring size, it is to be understood that other units of measurement are contemplated. Moreover, the ring size scale may be positioned on the tape member 60 and the distance scale may be positioned on the housing 12.

When it is desired to measure the length or other parameter of an object located outside of the loop 78, the measuring band 16 can be removed from the housing 12 by pulling the locking member 64 out of the groove 52 and then sliding the indicator 18 away from the end cap 14 and off the housing 12 until the locking member 64 is clear of the slot 54 in the end cap. It may be necessary to angle the locking member 64 in the slot 54 in order to facilitate its removal. The scale 72 on the tape member 50 can then be used for measuring the length or other parameter of an object, or the distance between objects. Installation of the measuring band 16 on the housing 12 is accomplished in the reverse order.

Figure 4:
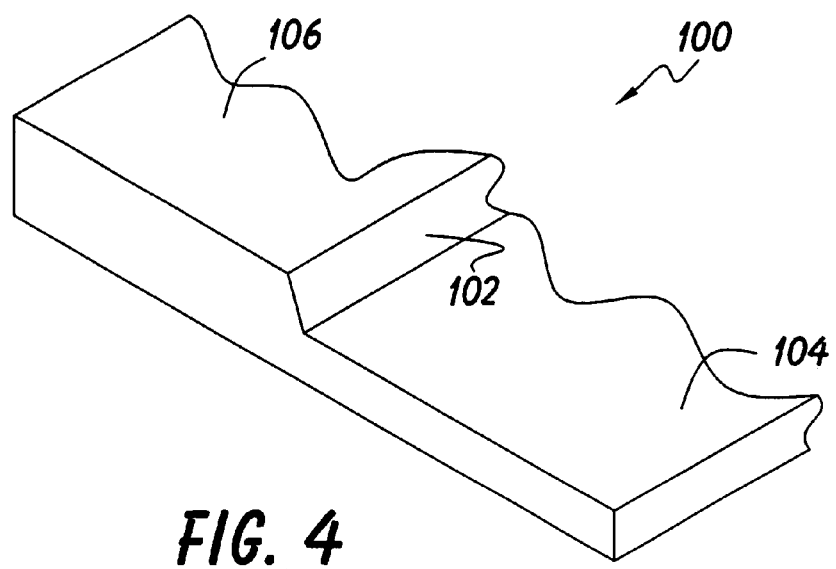
FIG. 4 is an isometric view of a portion of a measuring band for use in the measuring device according to a second embodiment of the invention.

With reference now to FIG. 4, a tape member 100 according to a second embodiment of the invention is illustrated. The tape member 100 is substantially similar in construction to the tape member 60 of the previous embodiment, with the exception that the groove 68 is replaced with a step 102 located between a lower surface 104 and an upper surface 106. Preferably, the step 102 extends along the length of the tape member 100 and functions to seat or hold an object, such as a gemstone, during measurement.

Figure 5:
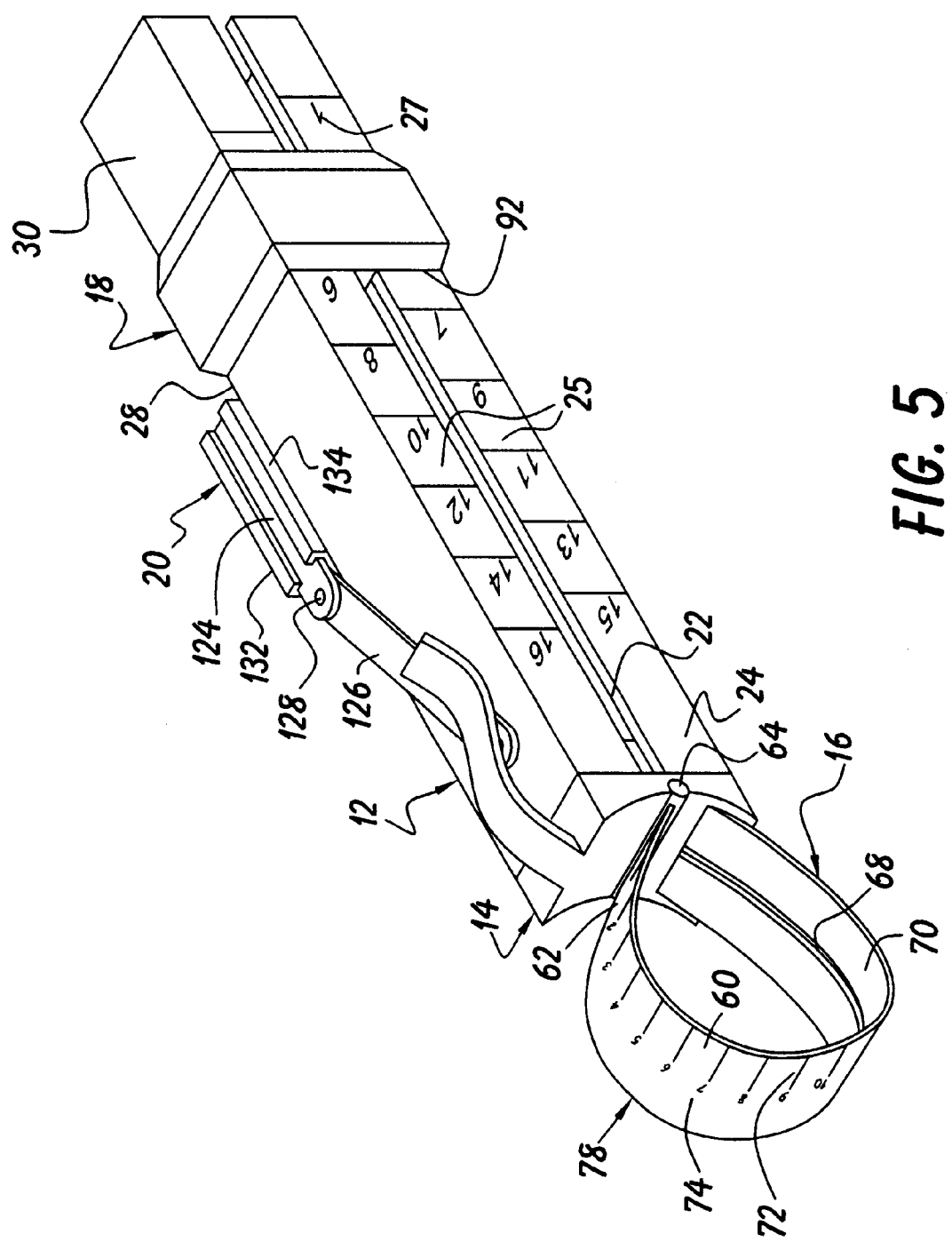
FIG. 5 is a front isometric view of the assembled measuring device of FIG. 2 and illustrating a lens assembly in a stored position.

Referring now to FIGS. 1, 2 and 5, the magnifying assembly 20 includes a housing 110 with an opening 112 in which a lens or lens assembly 114 is mounted. Preferably, the lens is formed of high quality material and is similar in construction to a jewler's lens or eyepiece. Slots 116 and 118 are formed at an upper end 120 and lower end 122, respectively of the housing 110. A first adjustment arm 124 is slidably received in each slot 116 and 118. If desired, stops (not shown) or other means for preventing the separation of the housing 110 from the adjustment arms 124 can be provided. A free end of each arm 124 is pivotally connected to a second adjustment arm 126 at a first pivot joint 128. In turn, an opposite end of each second arm 126 is pivotally connected to one of the upper and lower walls 30, 32 at a second pivot joint 130. The pivot joints may be constructed of rivets or pins that fit into openings in each arm and the upper and lower walls to pivotally mount the arms together and to pivotally mount the arms to the housing 12.

When the magnifying assembly 20 is positioned for use (FIGS. 1 and 2), a front wall 132 of the housing 110 faces the loop 78 of the tape 60. When a gemstone or other object is mounted in the loop, the housing 110 can be adjusted with respect to the loop by sliding the housing along the arms 124 and pivoting the arms 124 and 126 about the first and second pivot joints to thereby locate the lens assembly 114 at the desired position for examining the gemstone or other object. When not in use, the housing 110 can be slid along the arms 124 and pivoted to a retracted position with a rear wall 134 of the housing 110 abutting the side wall 28 of the housing 12, as illustrated in FIG. 5.

It is to be understood that the terms front, rear, side, upper, lower, inner, outer, and their respective derivatives as used throughout the specification refer to relative, rather than absolute positions and/or orientations.

While the invention has been taught with specific reference to these embodiments, those skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A device for measuring at least one geometrical parameter of an object, the device comprising:
   an elongate housing having a hollow interior;
   a first measurement scale located along a length of the housing;
   an indicator slidably mounted on the housing for movement along the measurement scale, at least a portion of the indicator extending into the hollow interior; and
   a flexible measuring band having a first end connected to an end portion of the housing and a second end connected to the indicator portion within the housing, the flexible measuring band forming a measuring loop outside of the housing, the measuring loop including an inner surface and a groove formed in the inner surface for holding an object during measurement, wherein movement of the indicator along the housing causes expansion and contraction of the measuring loop to thereby adjust for the size of an object to be measured;
   wherein the relative position of the indicator with respect to the first measurement scale is indicative of the at least one geometrical parameter when at least a portion of the object is located within the measuring loop.

2. A measuring device according to claim 1, and further comprising a second measurement scale located on a length of the flexible measuring band.

3. A measuring device according to claim 2, wherein the first measurement scale denotes a first geometrical parameter and the second measurement scale denotes a second geometrical parameter that is different from the first geometrical parameter.

4. A measuring device according to claim 2, wherein the first measurement scale denotes ring size.

5. A measuring device according to claim 4, wherein the second measurement scale denotes distance.

6. A measuring device according to claim 5, wherein the measuring band is removably connected to the housing for measuring distance independent of the housing.

7. A measuring device according to claim 2, wherein the measuring loop further comprises an outer surface, and wherein the second scale is located on the outer surface.

8. A measuring device according to claim 1, and further comprising an end cap mounted to the end portion of the housing, and further wherein the first end of the measuring band is mounted to the end cap.

9. A measuring device according to claim 8, wherein the end cap comprises a first wall with an elongate groove formed in the wall, and further wherein the first end of the measuring band includes a locking member that snap-fits into the groove for releasably mounting the measuring band to the end cap.

10. A measuring device according to claim 8, wherein the first wall of the end cap further comprises a slot in communication with the hollow interior of the housing, the measuring band extending through the slot and into the hollow interior.

11. A measuring device according to claim 10, wherein an outer surface of the end cap is arcuate.

12. A measuring device according to claim 11, wherein the slot forms an arcuate pathway through the end cap from the arcuate outer surface.

13. A device for measuring at least one geometrical parameter of an object, the device comprising:

an elongate housing having a hollow interior;

a first measurement scale located along a length of the housing;

an indicator slidably mounted on the housing for movement along the measurement scale, at least a portion of the indicator extending into the hollow interior;

a flexible measuring band having a first end connected to an end portion of the housing and a second end connected to the indicator portion within the housing, the flexible measuring band forming a measuring loop outside of the housing, wherein movement of the indicator along the housing causes expansion and contraction of the measuring loop to thereby adjust for the size of an object to be measured; wherein the relative position of the indicator with respect to the first measurement scale is indicative of the at least one geometrical parameter when at least a portion of the object is located within the measuring loop; and a magnifying lens connected to the housing and adapted for positioning in proximity to the measuring loop for examining an object held within the measuring loop.

14. A measuring device according to claim 13, and further comprising at least one pivot arm connected between the magnifying lens and the housing to thereby permit pivoting movement of the magnifying lens with respect to the housing.

15. A measuring device according to claim 14, wherein the magnifying lens is slidably mounted to the at least one pivot arm.

16. A measuring device for indicating both the ring size of a user and the size of a gemstone, the measuring device comprising:

an elongate housing having a hollow interior;

a first measurement scale located along a length of the housing;

an indicator slidably mounted on the housing for movement along the measurement scale, at least a portion of the indicator extending into the hollow interior;

a flexible measuring band having a first end connected to an end portion of the housing and a second end connected to the indicator portion within the housing, the flexible measuring band forming a measuring loop outside of the housing, wherein movement of the indicator along the housing causes expansion and contraction of the measuring loop to thereby adjust for the size of a gemstone to be measured; and a second measurement scale located on a length of the flexible measuring band;

one of the first and second measurement scales having first indicia representative of different ring sizes, the other of the first and second measurement scales having second indicia representative of distance;

wherein the relative position of the indicator with respect to the first measurement scale is indicative of one of the first and second indicia when at least a portion of the gemstone is located within the measuring loop, and the relative position of the second measurement scale with respect to the housing is indicative of the other of the first and second indicia.

17. A device for measuring at least one geometrical parameter of an object, the device comprising:

an elongate housing having a hollow interior;

a first measurement scale located along a length of the housing;

an indicator slidably mounted on the housing for movement along the measurement scale, at least a portion of the indicator extending into the hollow interior; and a flexible measuring band having a first end connected to an end portion of the housing and a second end connected to the indicator portion within the housing, the flexible measuring band forming a measuring loop outside of the housing, the measuring loop including a stepped inner surface for holding an object during measurement, wherein movement of the indicator along the housing causes expansion and contraction of the measuring loop to thereby adjust for the size of an object to be measured;

wherein the relative position of the indicator with respect to the first measurement scale is indicative of the at least one geometrical parameter when at least a portion of the object is located within the measuring loop.

* * * * *

UNITED STATES PATENT AND TRADEMARK OFFICE
CERTIFICATE OF CORRECTION

PATENT NO.   : 6,253,459 B1
DATED        : July 3, 2001
INVENTOR(S)  : Barnhill

It is certified that error appears in the above-identified patent and that said Letters Patent is hereby corrected as shown below:

Column 7,
Line 17, A measuring device according to claim "8" should read -- 9 --

Signed and Sealed this

Twenty-eighth Day of May, 2002

Attest:

Attesting Officer

JAMES E. ROGAN
*Director of the United States Patent and Trademark Office*